UNITED STATES PATENT OFFICE.

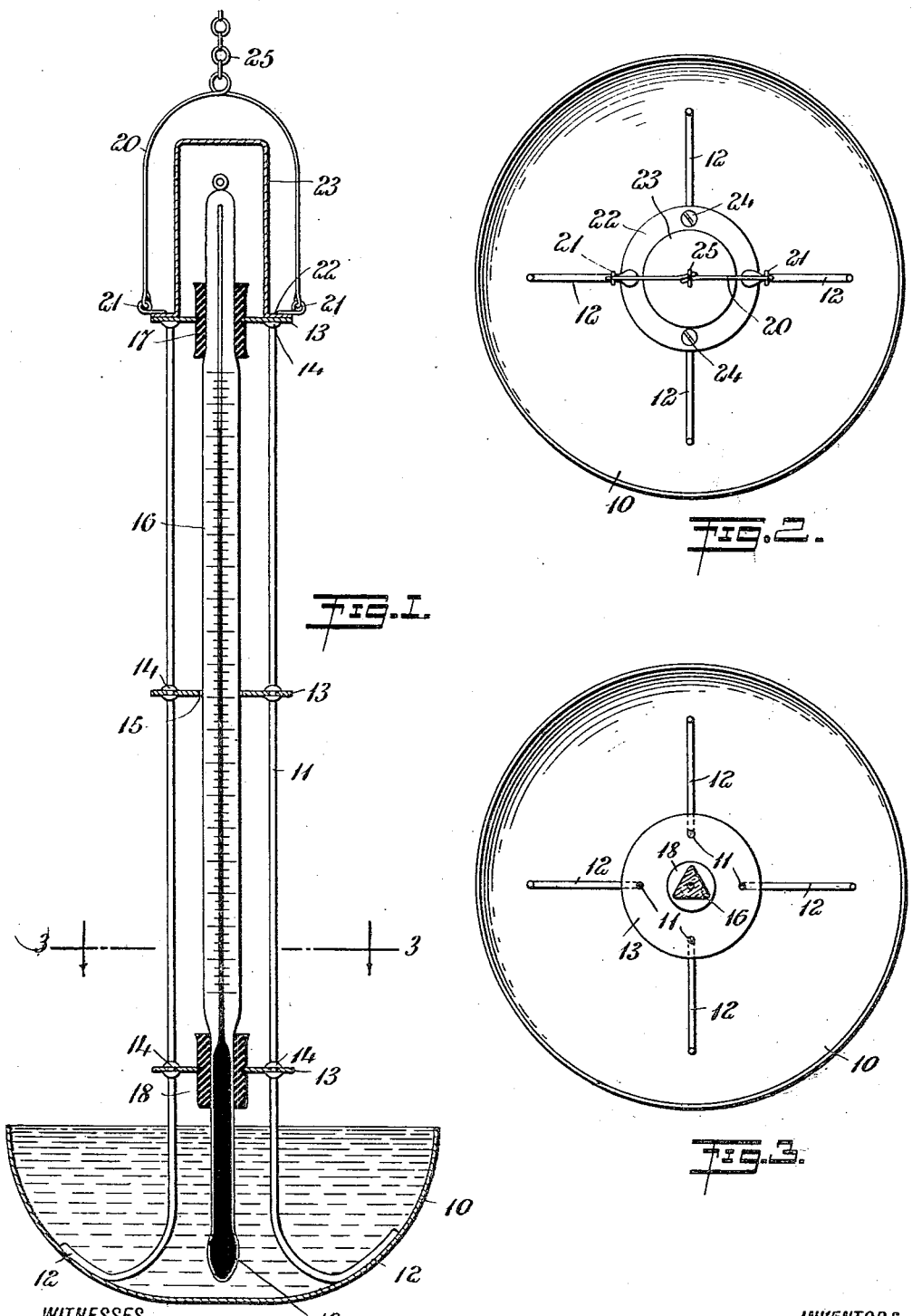

CHARLES N. MUELLER AND WILLARD V. VAN DOREN, OF CHICAGO, ILLINOIS.

THERMOMETER-HOLDER.

1,119,627.　　　　　Specification of Letters Patent.　　　Patented Dec. 1, 1914.

Application filed November 11, 1913. Serial No. 800,292.

*To all whom it may concern:*

Be it known that we, CHARLES N. MUELLER, a subject of the Emperor of Germany, and WILLARD V. VAN DOREN, a citizen of the United States, both residents of Chicago, in the county of Cook and State of Illinois, have invented a new and Improved Thermometer-Holder, of which the following is a full, clear, and exact description.

This invention relates to an improved device for holding a thermometer and supporting a receptacle or cup with the thermometer extending thereinto and designed for special use in breweries, distilleries, chemical works and any kind of establishment where liquids are handled under conditions where the temperature must be frequently taken, so that when the device is let down into the liquid and the thermometer is caused to show the temperature thereof, the liquid in the cup will retain the thermometer unchanged for several minutes so as to permit the observer to determine the correct temperature of the liquid or to take the thermometer to a place where sufficient light can be had to conveniently read it.

Another object of the invention is to provide a holder for thermometers permitting one to ascertain the exact temperature of liquids in deep tanks and in tanks located in dark places, in which the thermometer is also protected from breakage and in which means are also provided for removably holding the thermometer in position so as to permit it to be replaced by another thermometer varying in its scale or type of indexing as well as in size.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a vertical sectional view of the improved thermometer holder with a thermometer held therein; Fig. 2 is a plan view of the device; and Fig. 3 is a cross sectional view taken on the line 3—3 of Fig. 1.

In the illustrated embodiment of the invention, the improved holder is shown as comprising a cup or receptacle 10 preferably of copper or other heat-conducting material of some degree of flexibility, in which are supported a plurality of wires or rods 11, preferably four in number, and forming a framework for the protection of the thermometer. The lower ends of the rods 11 are curved outward and upward, as shown at 12, and attached to the interior wall of the cup 10. The rods 11 forming the framework are held in rigid spaced relation by means of a plurality of apertured rings 13 soldered or otherwise connected to the rods against longitudinal displacement thereon, as shown at 14, and disposed at a mid-point and near the ends of the rods, respectively, the lower ring, however, being disposed slightly above the upper edge of the receptacle, and each having apertures through which the rods extend.

The aperture 15 of the intermediate ring receives a thermometer 16 comparatively snugly therethrough, while the aperture of the upper ring receives a rubber or other compressible insulating sleeve 17 and the aperture of the lower ring a similar sleeve 18 through which the thermometer is snugly engaged and supported to obviate breakage from shock, also to prevent the heat of the metal affecting the temperature shown on the thermometer which has its bulb 19 immersed well down into the liquid contained in the cup after the device is let down into the tank and withdrawn. For this latter purpose a bail 20 is pivoted as shown at 21 to apertured ears carried by the flanged portion 22 of a cap 23 which is, through the instrumentality of the flanged portion, attached to the upper ring 13 as by means of fastening screws 24. This cap fully incloses the upper end of the thermometer and is also preferably of copper or similar material, to protect the thermometer from breakage but can be readily removed, as will be apparent, for the purpose of changing thermometers. A chain or other flexible connection 25 is attached to the bail for the purpose of lowering the device into a tank or vat containing the liquid, the temperature of which is to be ascertained.

Thus it will be seen that a thermometer held in a device such as described will be protected from breakage and may be dropped into a tank or any other kind of liquid container so as to affect the expansion of the indicating fluid and affect the reading of the thermometer. In devices heretofore constructed the thermometer after being withdrawn from the liquid would change considerably and thus the correct temperature was not available. In the present device, however, the copper cup will remain full of the liquid when the thermometer is pulled to the top of the container or tank, and as the bulb of the thermometer remains immersed in the liquid and stays in the cup, the liquid serves to preserve the thermometer reading to remain unchanged for several minutes so that not only can the proper temperature be ascertained at that particular moment, but in places where there is insufficient light the observer can take the thermometer to a place where he can find sufficient light to conveniently read it and still obtain an accurate reading of the temperature. Also, by removing the cap at the top of the framework carrying the bail or handle 20, the thermometer can be readily removed and another substituted for it, it being apparent that the holder is adapted to any size of thermometer by the use of different size sleeves 17 and 18, so that any type of straight glass thermometer, from the most slender and delicate chemical thermometer to a paper scale type of thermometer, such as is illustrated, may be used.

Having thus described our invention, what we claim as new and desire to secure by Letters Patent is:—

1. A thermometer holder, comprising a plurality of rods having their lower ends bent outward and upward, an imperforate liquid holding receptacle in which said rods at their lower portions are secured, a plurality of rings secured to the rods in fixed relation and adapted to receive a thermometer through the apertures thereof with the bulb of the thermometer extending into the receptacle, insulating sleeves mounted in the apertures of certain of the rings and supporting the thermometer therein against breakage and affection by the heat of the frame, and means attached to the upper end of the frame for suspending the holder.

2. A thermometer holder, embodying a frame comprising a plurality of rods held in fixed and uniformly spaced relation, an open top liquid holding cup to the inner wall of which the lower ends of the rods are attached, spaced connecting members for said rods, insulating means carried by said connecting members for holding a thermometer in the frame to extend into the cup, a protecting member carried by the upper end of the frame to inclose the adjacent end of the thermometer and prevent upward displacement thereof, a bail pivoted to the protecting member, and a flexible suspending member connected to the bail.

3. A thermometer holder embodying an open frame comprising a plurality of rods held in fixed spaced parallel relation, a liquid holding receptacle of larger transverse dimension than the frame, the lower ends of the rods being bent outwardly and upwardly for attachment to the receptacle, a plurality of vertically spaced apertured rings connecting the said rods, insulating means mounted in the apertures of said rings for holding a thermometer in the frame to extend into the receptacle, and a protecting cap inclosing the upper end of the thermometer and removably attached to the same to permit convenient placing and removal of the thermometer.

In testimony whereof we have signed our names to this specification in the presence of two subscribing witnesses.

CHARLES N. MUELLER.
WILLARD V. VAN DOREN.

Witnesses:
JOSEPH C. VLASAK,
STELLA RYAN.